United States Patent
Krystal et al.

(10) Patent No.: US 12,325,618 B2
(45) Date of Patent: Jun. 10, 2025

(54) LIQUID DISPENSING ARRANGEMENTS AND METHODS

(71) Applicant: STRAUSS WATER LTD, Or Yehuda (IL)

(72) Inventors: Eyal Krystal, Kfar-Saba (IL); Dany Ascher, Kibbutz Mishmarot (IL); Meital Shafir, Kiryat Ono (IL); Omer Ben Baruch, Kiryat Ono (IL); Orly Nahum, Ramat Gan (IL)

(73) Assignee: STRAUSS WATER LTD (IL)

( * ) Notice: Subject to any disclaimer, the term of this patent is extended or adjusted under 35 U.S.C. 154(b) by 113 days.

(21) Appl. No.: 18/003,516

(22) PCT Filed: Jul. 1, 2021

(86) PCT No.: PCT/IL2021/050813
§ 371 (c)(1),
(2) Date: Dec. 28, 2022

(87) PCT Pub. No.: WO2022/003696
PCT Pub. Date: Jan. 6, 2022

(65) Prior Publication Data
US 2023/0234826 A1    Jul. 27, 2023

(30) Foreign Application Priority Data
Jul. 1, 2020    (IL) .......................................... 275785

(51) Int. Cl.
B67D 1/00        (2006.01)
B67D 1/08        (2006.01)
(Continued)

(52) U.S. Cl.
CPC .......... B67D 1/0884 (2013.01); B67D 1/0011 (2013.01); B67D 1/0014 (2013.01);
(Continued)

(58) Field of Classification Search
CPC .. B67D 1/0884; B67D 1/1011; B67D 1/0014; B67D 1/0888; B67D 2001/1263; B67D 2210/0001; B67D 2210/00118; B67D 1/001; B67D 1/0857; B67D 1/0895; B67D 1/0881; B67D 1/0878; B67D 1/1202;
(Continued)

(56) References Cited

U.S. PATENT DOCUMENTS

2005/0279689 A1    12/2005    Oranski et al.
2008/0041073 A1    2/2008    Ferragut et al.
(Continued)

FOREIGN PATENT DOCUMENTS

EP    2249942 A1    11/2010
KR    20190109834 A    9/2019
(Continued)

OTHER PUBLICATIONS

Posavec, Daniel; International Search Report and Written Opinion for PCT/IL2021/050813; dated Sep. 13, 2021; 10 pages.

*Primary Examiner* — Vishal Pancholi
(74) *Attorney, Agent, or Firm* — Emerson Thomson & Bennett, LLC; Daniel A. Thomson

(57) ABSTRACT

The present disclosure relates to liquid dispensing arrangements, and particularly to arrangements for distribution of a dispensed liquid.

24 Claims, 6 Drawing Sheets

(51) Int. Cl.
*C02F 1/00* (2023.01)
*E03C 1/044* (2006.01)
*B67D 1/12* (2006.01)

(52) U.S. Cl.
CPC ............ *B67D 1/0888* (2013.01); *C02F 1/003* (2013.01); *C02F 1/008* (2013.01); *E03C 1/044* (2013.01); *B67D 2001/1263* (2013.01); *B67D 2210/0001* (2013.01); *B67D 2210/00118* (2013.01); *C02F 2201/005* (2013.01); *C02F 2209/40* (2013.01); *C02F 2307/10* (2013.01); *E03C 2201/40* (2013.01)

(58) Field of Classification Search
CPC .... C02F 1/003; C02F 1/008; C02F 2201/005; C02F 2209/40; C02F 2307/10
See application file for complete search history.

(56) References Cited

U.S. PATENT DOCUMENTS

| | | |
|---|---|---|
| 2008/0256972 A1 | 10/2008 | Knoll et al. |
| 2012/0318722 A1 | 12/2012 | Guess |
| 2019/0012498 A1* | 1/2019 | Mahncke ............ G06Q 20/3278 |
| 2021/0380391 A1* | 12/2021 | Defazio ................ B67D 1/0006 |
| 2022/0212952 A1* | 7/2022 | Veloo .................... G06Q 50/06 |
| 2023/0100391 A1* | 3/2023 | Makmel .................. C02F 1/008 |
| | | 210/96.1 |
| 2024/0124326 A1* | 4/2024 | Maikov .................... B67D 1/07 |

FOREIGN PATENT DOCUMENTS

| | | |
|---|---|---|
| WO | 2009090197 A1 | 7/2009 |
| WO | WO2020112002 A1 | 6/2020 |

* cited by examiner

LIQUID DISPENSING ARRANGEMENTS AND METHODS

TECHNOLOGICAL FIELD

The present disclosure generally relates to liquid dispensing arrangements, and particularly to arrangements for distribution of a dispensed liquid.

BACKGROUND ART

References considered to be relevant as background to the presently disclosed subject matter are listed below:
US 2005/279689
US 2008/041073
US 2008/256972
US 2012/318722

Acknowledgement of the above references herein is not to be inferred as meaning that these are in any way relevant to the patentability of the presently disclosed subject matter.

BACKGROUND

There is an ongoing need to expand the utilization of liquid dispensing devices for applying various different prescribed processes to the dispensed liquid. This is particularly beneficial in settings wherein the liquid is subject to one or more treatments (e.g., filtration, purification, distillation, disinfection, and/or suchlike) before it is processed and/or dispensed to the end user. In water dispensing systems, for example, a stream of water supplied to the system from a pressurised water source (tap water) usually undergoes one or more filtration, purification and/or disinfection, processes, and the treated stream of water is then heated, or cooled, before it is dispensed for use.

For example, the water dispenser described in US Patent Publication No. 2005/279689, the disclosure of which is incorporated herein by reference, includes a water inlet adapted to receive water from a water supply, a water filter operative to filter water received from the water supply via the water inlet, a water outlet operative to provide filtered water received from the water filter, a water spill collector, and a pivotably mounted drainage-equipped water container support having a first operative orientation underlying the water outlet and defining a downwardly inclined water spill drainage pathway communicating with the water spill collector and a second, non-operative, orientation not underlying the water outlet.

US Patent Publication No. 2008/041073 discloses a water product dispensing system including a dispenser mounted for selectively releasing a water product, a display provided on the dispenser and a sensor operatively coupled to the dispenser. The dispensing system also includes a sensor for determining a fault condition. In the event that a fault condition exists, the fault condition is presented upon the display only upon operation of the dispensing system. The water product dispensing system also includes a water filter, with the fault condition indicating a need to replace the water filter.

US Patent Publication No. 2008/256972 describes a water dispenser for dispensing hot water, cold water, and carbonated water, all of which is filtered. The dispenser includes a housing defining a front dispensing face, a rear face, opposite side walls and a bottom wall. A filter is mounted in the housing and has a rear end connectable to a source of water and a front end accessible at the front face of the housing to facilitate replacing the filter. A dispensing faucet is disposed at the front face of the housing. A hot water tank is located at one side of the housing and has an inlet for receiving filtered water from the filter and a hot water outlet near the dispensing faucet for delivering hot water thereto. An ice bank assembly is located at an opposite side of the housing and has an inlet for receiving filtered water from the filter and a cold water outlet near the dispensing faucet for delivering cold water thereto. A compressor is mounted on the bottom wall of the housing and is coupled to one end of the ice bank evaporator. A condenser coil is mounted at the rear face of the housing and is coupled between the compressor and an opposite end of the evaporator. A carbonator has an inlet for receiving filtered water from the filter and an outlet near the dispensing faucet for delivering carbonated water thereto.

The filter described in US Patent Publication No. 2012/318722 comprises a housing, a filter medium positioned within the housing, the filter medium having an operational life related to an amount of fluid passed through the filter medium, and a one-bit memory element coupled to the housing, the one-bit memory having a first state that indicates that the operational life of the filter medium has not expired and having a second state that indicates that the operational life of the filter medium has expired. The one-bit memory element may be illustratively embodied as a fusible link.

GENERAL DESCRIPTION

The present application provides liquid dispensing arrangements, and related methods. Heretofore, liquid dispensing systems were typically designed to incorporate various utilizations integrated to reside within the same apparatus. One or more valves are usually used in such apparatus to controllably direct a stream of treated (e.g., filtered, disinfected, distilled, purified, and/or suchlike) liquid towards designated liquid processing and dispensing assemblies provided in the apparatus. Each liquid processing and dispensing assembly is configured to receive the stream of treated liquid, apply one or more processes thereto (e.g., cooling, heating, freezing), and immediately dispense the processed liquid product to the end user, or store it in a suitable container for future dispense and use.

This approach, of integrating several liquid processing and dispensing assemblies in the same apparatus, suffers several disadvantages, as the stream of treated liquid can be directed towards a single processing and dispensing assembly at any given moment. Such apparatus typically can dispense only one selected processed liquid product at any given time, which disables simultaneous dispensing of several processed liquid products at the same time. In addition, end users are often reluctantly required to purchase expensive apparatuses having several integrated liquid processing and dispensing assemblies, which are not essentially required, and they cannot define themselves a specific combination of liquid processing and dispensing assemblies of their choice in such apparatuses.

The liquid dispensing arrangements disclosed herein overcome these disadvantages by concatenating one or more independent secondary processing and dispensing units (also referred to herein as secondary units) from a main treatment unit (also referred to herein as main unit), to enable each secondary unit to receive and store a defined amount of treated liquid from the main unit inside a liquid reservoir thereof. This way, one or more processes can be simultaneously applied, separately and independently, to the treated liquid in the main unit, and/or to the treated liquid stored in the reservoir of each secondary processing and dispensing unit, for simultaneous provision of their final liquid products to the end user(s) at any given time. Optionally, but in some embodiments preferably, the main unit incorporates one or more liquid processing and dispensing assemblies. However, the innovative approach disclosed herein permits construction of a substantially simplified main unit, having a limited number of liquid processing utilities (e.g., heating and/or cooling), which thus permits substantially inexpensive, and easy to maintain, designs thereof.

The liquid dispensing arrangements disclosed herein are not limited to concatenation of secondary processing and dispensing units, but, as described herein below, also permits parallel connection of two or more secondary processing and dispensing units to the main unit, or to another secondary processing and dispensing unit.

In possible embodiments one or more secondary units can be configured to just store, and whenever required dispense, the treated liquid received from the main unit and stored in their liquid reservoirs i.e., without applying any processes thereto. Optionally, but in some embodiments preferably, at least one of the secondary units is further configured to apply one or more processes to the treated liquid stored in its reservoir before dispensing the same to the end user. For example, and without being limiting, the treated liquid supplied by the main unit and stored in the reservoirs of the secondary units can be filtered and/or disinfected tap-water, and the secondary units according to possible embodiments can be configured to produce ice cubes, one or more beverages (e.g., coffee, tea, and/or carbonated water and/or juices), purified water, oxygenated (oxygen enriched) water, mineralized water, energized water, and suchlike.

Optionally, in possible embodiments one or more of the secondary units are configured to perform, inline, one or more processes to the treated liquid product as it is received from the main unit, and immediately thereafter dispense the processed treated liquid to the end user i.e., without storing the treated water therein, so a reservoir is not needed in such secondary units. For example, but without being limiting, the one or more processes performed by one or more of the secondary units can include inline heating of the treated liquid, without storing the treated liquid in advance.

The main unit can be configured to continuously supply the treated water product thereby produced to the secondary units to guarantee that their liquid reservoirs are always fully filled e.g., using level-sensitive and/or pressure sensitive valves. Optionally, but in some embodiments preferably, each secondary unit is configured to generate control signals whenever the level of the of the treated liquid in its reservoir falls below a determined threshold level for requesting supply of treated liquid thereto from the main unit. The control signals can be communicated over electric wires connecting between the main and secondary units, and/or wirelessly (e.g., ZigBee, WiFi, Bluetooth, or suchlike). The main unit can be configured to receive the request control signals from the secondary units, and correspondingly activate respective liquid supply valve(s) for streaming treated liquid product therefrom to the respective secondary unit(s) until their reservoirs are filled.

A communication module can be provided in the main and secondary units for communicating the control signals, and other information, therebetween, and/or with external devices/systems e.g., a smart device, such as a smartphone of tablet, and/or a remote computer system and/or server, for processing, monitoring, and/or maintenance.

Optionally, and in some embodiments preferably, the request control signals generated by the secondary units includes an indication of the amount of treated liquid required by the secondary unit for filling its reservoir. For this purpose one or more liquid level sensors can be used in each secondary unit for measuring the level of the treated liquid stored in it reservoir, and generating liquid level signals/data indicative thereof. The main unit accordingly comprises in some embodiments one or more flow meters for measuring the amount of treated liquid supplied to the secondary units, and generating flow signals/data indicative thereof, and accordingly regulating the activation and deactivation of the liquid supply valve(s). Accordingly, the main unit can be configured to stream the treated liquid product to the secondary unit until an indication is received from the secondary unit that its reservoir is filled e.g., based on liquid level sensors thereof, and/or until it is determined from the flow signals/data from the one or more flow meters of the main unit that the required amount of treated liquid product been supplied to the secondary unit.

In some embodiments the main unit comprises at least one liquid treatment (e.g., filter and/or disinfection) device and a respective at least one flow meter coupled to the at least one liquid treatment device for measuring the amount of treated liquid thereby produced. The main unit can use one or more main control units configured to receive and process the request control signals from the secondary units, activate one or more controllable liquid supply valves thereof for supplying the treated liquid thereby produced to the secondary units, and/or to a liquid dispenser thereof (with or without applying one or more liquid processes thereto), process the flow data from the one or more flow meters, and based thereon determine whether to deactivate one or more of the liquid supply valves whenever the requested amount of treated liquid been thereby supplied.

The secondary units can also use one or more secondary control units for controlling their functionality, the supply of the treated liquid thereto, and/or operation of any liquid processing and/or dispensing assemblies thereof. The secondary control unit can be configured to process the liquid level signals/data generated by the one or more liquid level sensors of its liquid reservoir, determine based thereon if the reservoir need to be refilled, and whenever needed, generate control signals requesting the main unit to stream a determined amount of treated liquid thereto.

Optionally, but in some embodiments preferably, one or more cable assemblies are used to connect between the main unit and the secondary unit(s), each cable assembly configured to provide fluid communication and electrical connection between the main and secondary units. Thus, in some embodiments, the cable assembly connecting between the units comprises liquid conduit(s) and electric wires. The liquid conduit(s) of the cable assembly are configured for streaming the treated liquid between the units, and the electric wires are used at least for communicating control signals between the units. In some embodiments at least some of the electric wires of the cable assembly are used for power supply. Such power supply wires can be used to power the one or more secondary control units, and/or other components of the secondary units (e.g., liquid processing assemblies).

Accordingly, the main unit can be powered only by the mains electricity system (e.g., general purpose alternating current—AC), and one or more of the secondary units can be configured receive two or more separate power supplies. In some embodiments a secondary unit can be configured to receive a first (general purpose) power supply from the mains electricity system for powering internal components thereof e.g., liquid processing assemblies, and a second (low-voltage) power supply received from the main unit over the cable assembly for powering the one or more secondary control units. Optionally, but in some embodiments preferably, the one or more main control units are configured to control the power consumption of the main and secondary units from the mains electricity system, in order to prevent overloads. For example, the secondary units can be configured to request from the main unit permission to activate their liquid processing assemblies (e.g., heaters), and the main unit can be configured to permit such request whenever its liquid processing assemblies are not being thereby used.

One inventive aspect disclosed herein relates to a liquid dispensing system comprising at least one main liquid supply unit configured to receive a stream of liquid and apply one or more treatments thereto, and one or more secondary liquid supply units fluidly coupled to the at least one main unit, the at least one main liquid supply unit configured to selectively stream the treated liquid product to at least one of the secondary liquid supply units for dispensing by a dispenser thereof. The system comprises in some embodiments one or more additional secondary liquid supply units fluidly coupled to at least one of the secondary liquid supply units. Optionally, the main liquid supply unit comprises a dispenser. The main liquid supply unit can be configured to selectively stream the treated water product to its dispenser and/or to at least one of the secondary liquid supply units.

The system comprises in some embodiments a filter device provided in the main liquid supply unit for carrying out at least one of the treatments to the received liquid. Optionally, at least one liquid processing assembly is provide in the main and/or the secondary liquid supply units for processing the treated liquid product before dispensing it. The at least one liquid processing assembly can be configured to apply to the treated liquid product at least one of the following: heating, cooling, freezing, vaporizing, sterilizing, purifying, energize, mineralizing.

Optionally, but in some embodiments preferably, the system comprises at least one flow sensing device configured to measure an amount of the treated liquid product produced by the main liquid supply unit, and generate flow signals/data indicative thereof. A controllable supply valve can be used to selectively stream the liquid to the main liquid supply unit whenever the treated liquid product is required by the main liquid supply unit, or by one of the one or more secondary liquid supply units.

The system comprises in some embodiments at least one controllable dispensing valve configured to selectively stream the treated liquid product to the dispenser of the main liquid supply unit. The system can use at least one main control unit configured and operable to control the dispensing of the treated liquid product from the main liquid supply unit. Optionally, a user interface is used to receive user's inputs. The at least one main control unit can be configured and operable to change the state of the at least one controllable dispensing valve based on the received user's inputs. The at least one main control unit can be configured to control the dispensing of the treated liquid product based of the flow signals/data generated by the at least one flow sensing device.

In some embodiments at least one reservoir is provided in at least one of the liquid supply units for storing thereinside streams of the treated liquid product. A controllable secondary supply valve can be used to control the stream of the treated liquid product to the at least one reservoir. Optionally, at least one controllable secondary dispensing valve is used to control dispensing of the treated liquid product from the at least one reservoir.

At least one secondary control unit can be used to control the filling of the at least one reservoir with the treated liquid product and/or dispensing it from the at least one reservoir. The system comprises in some embodiments at least one cable assembly configured to fluidly communicate between the main and secondary liquid supply units, and to electrically couple between said main and secondary liquid supply units. The cable assembly comprises is some embodiments at least one conduit for fluidly communicating between the main and secondary liquid supply units, and electrical wires for electrically coupling between said main and secondary liquid supply units. At least some of the electrical wires can be power supply wires configured to supply electrical power from the main liquid supply unit to at least one of the secondary liquid supply units.

The main and secondary control units can be configured and operable to implement an asynchronous communication protocol between the main and secondary liquid supply units defining the main liquid supply unit as a slave and at least one of the secondary liquid supply units as master. Alternatively, the main liquid supply unit is defined in the asynchronous communication protocol as the master, and at least one of the secondary liquid supply units as the slave. The communication protocol can be configured to provide the main liquid supply unit control over consumption of shared resources of the system.

In some embodiments the at least one secondary control unit is configured and operable to transfer to the at least one main liquid supply unit requests for streams of the treated liquid product. The at least one main control unit can be configured and operable to receive and process the request generated by the secondary control unit and determine based thereon an amount of the treated liquid product to stream thereto.

The at least one secondary control unit can be configured and operable to transfer to the at least one main liquid supply unit requests for activation of power consuming processes thereof. Optionally, the at least one main control unit is configured and operable to selectively approve or deny the requests for activation of power consuming processes to prevent overloads.

The system comprises in some embodiments at least one communication module configured to communicate signals/data between the main and/or secondary liquid supply units and an external device or system for thereby monitoring and/or operating the dispensing of the treated liquid product. Optionally, the main and/or secondary control units are configured and operable to receive instructions from the external device or system to change a state of one of, and/or carrying out maintenance of, and/or firmware updates of, and/or liquid processing in, at least one of the liquid supply units.

The system optionally comprises at least one user identification device configured to generate identification data of a user of the main and/or secondary liquid supply units. At least one of the control units can be configured and operable to use the identification data to conduct a user identification procedure before or during the liquid dispensing. Optionally, at least one of the control units is configured and operable to record usage and/or preference data associated with each identified user. In possible embodiments at least one of the control units is configured and operable receive and monitor personal consumption program of at least one of the identified users.

Another inventive aspect disclosed herein relates to a liquid dispensing method comprising: receiving a stream of liquid by at least one main liquid supply unit; applying one or more treatments to the liquid stream received in the at least one main liquid supply unit to thereby produce a treated liquid product; selectively streaming the treated liquid product from the at least one main liquid supply unit to at least one secondary liquid supply unit; and dispensing the treated liquid product by the at least one secondary liquid supply unit. The method comprises in some embodiment selectively dispensing the treated water product by a dispenser of the at least one main liquid supply unit.

In some embodiments applying of the one or more treatments comprises filtering the received liquid. The method may comprise applying at least one liquid process to the treated liquid product before dispensing it by the main and/or the secondary liquid supply units. Optionally, the at least one liquid process comprises at least one of the following: heating, cooling, freezing, vaporizing, sterilizing, purifying, energize, mineralizing.

The method comprises in some embodiments measuring an amount of the treated liquid product produced by the main liquid supply unit, and generating flow signals/data indicative thereof. The method optionally comprises controlling the dispensing of the treated liquid product from the at least one main liquid supply unit based of the flow signals/data.

The method may comprise receiving user's inputs, and controlling the dispensing of the treated liquid product based on said user's inputs. The method optionally comprises storing streams of the treated liquid product in at least one reservoir provided in at least one of the liquid supply units. In possible embodiments the method comprises communicating signals/data between the main and secondary liquid supply units. The method comprises in possible embodiments providing electrical power supply from the at least one main liquid supply unit to at least one of the secondary liquid supply units.

In some possible embodiments the method comprises utilizing an asynchronous communication protocol between the main and secondary liquid supply units, and defining the at least one main liquid supply unit as a slave and at least one of the secondary liquid supply units as a master. Alternatively, the main liquid supply unit is defined in the asynchronous communication protocol as the master, and at least one of the secondary liquid supply units as the slave. The method optionally comprises providing the main liquid supply unit control over consumption of shared resources of the liquid supply units.

The method optionally of comprises transferring to the at least one main liquid supply unit requests for streams of the treated liquid product from the at least one secondary control unit. The method comprises in some embodiments transferring to the at least one main liquid supply unit requests for activation of power consuming processes of the at least one secondary control unit. Optionally, the method comprises selectively approving or denying the requests for activation of power consuming processes to prevent overloads.

In a possible embodiment the method comprises communicating signals/data between the main and/or secondary liquid supply units and an external device or system for monitoring and/or operating the dispensing of the treated liquid product. Optionally, but in some embodiments preferably, a user identification procedure is carried out before or during the liquid dispensing by the main and/or the secondary liquid supply units. The method may comprise recording usage and/or preference data associated with each identified user, and receiving and monitoring personal consumption program of at least one of said identified users.

BRIEF DESCRIPTION OF THE DRAWINGS

In order to understand the invention and to see how it may be carried out in practice, embodiments will now be described, by way of non-limiting example only, with reference to the accompanying drawings. Features shown in the drawings are meant to be illustrative of only some embodiments of the invention, unless otherwise implicitly indicated. In the drawings like reference numerals are used to indicate corresponding parts, and in which.

DETAILED DESCRIPTION OF EMBODIMENTS

Figure 1:
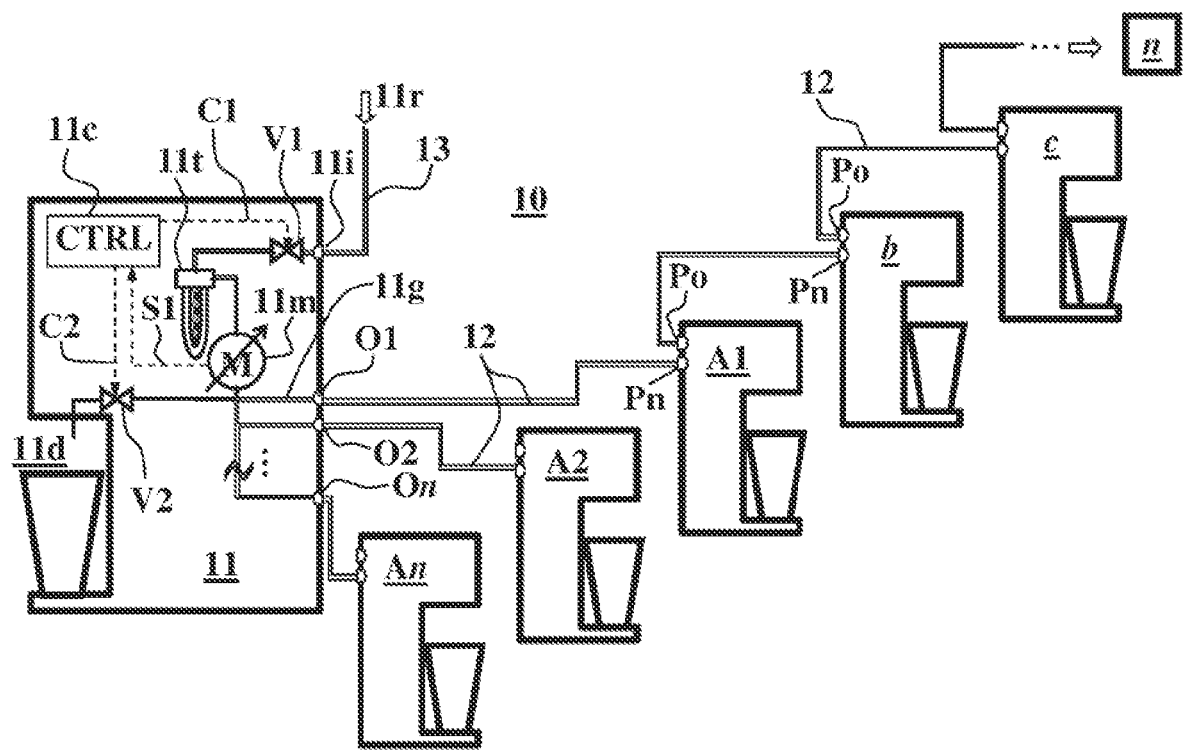
FIG. 1 schematically illustrates a liquid dispensing arrangement according to some possible embodiments.

One or more specific embodiments of the present disclosure will be described below with reference to the drawings, which are to be considered in all aspects as illustrative only and not restrictive in any manner. In an effort to provide a concise description of these embodiments, not all features of an actual implementation are described in the specification. Elements illustrated in the drawings are not necessarily to scale, or in correct proportional relationships, which are not critical. Emphasis instead being placed upon clearly illustrating the principles of the invention such that persons skilled in the art will be able to make and use the liquid dispensing schemes, once they understand the principles of the subject matter disclosed herein. This invention may be provided in other specific forms and embodiments without departing from the essential characteristics described herein.

The present application provides liquid dispensing arrangements configured to distribute the dispensing of one or more liquid products to a plurality liquid dispensing units. The fluid dispensing arrangements disclosed herein comprise at least one main treatment (and optionally also dispensing) unit, and at least one secondary dispensing unit in fluid communication with the main treatment unit. The at least one main treatment unit is configured to receive a stream of source liquid (e.g., tap water), and upon demand apply one or more treatments (e.g., filtration, disinfection, purification, distillation, and/or suchlike) to the received source liquid stream. The at least one main treatment unit can be configured to supply the treated stream of liquid thereby produced to a dispenser thereof and/or to the at least one secondary dispensing unit.

The at least one main treatment unit accordingly comprises at least one liquid treatment device (e.g., filter) configured to produce the stream of treated liquid product. A flow meter can be used to measure the amount of treated liquid produced by the at least one main treatment device. Optionally, but in some embodiments preferably, the at least one main treatment unit also comprises one or more liquid processing assemblies (e.g., cooling and/or heating), and the at least one main treatment unit can be accordingly configured to apply one or more liquid processes to the stream of treated liquid product before dispensing the same by its dispenser.

In some embodiments the at least one main treatment unit comprises one or more reservoirs. For example, and without being limiting, the at least one main treatment unit can have a respective reservoir associated with each liquid process thereof. This way, the at least one main treatment unit can be configured to store a certain amount of each processed liquid product in a respective reservoir thereof readily prepared for dispensing therefrom e.g., store a certain amount of heated liquid product in a hot liquid reservoir, a certain amount of chilled liquid product in a cool liquid reservoir, etc. This way, the at least one main treatment unit can immediately dispense the processed liquid products upon demand from its reservoir.

Optionally, but in some embodiments preferably, the at least one main treatment unit is a liquid treatment device implemented without self-dispensing abilities, and configured to supply the treated liquid product thereby produced to the at least one secondary unit. In such embodiments the at least one main treatment unit can be a type of under the sink (i.e., hidden) unit. In this case, there is also no need to provide liquid processing assemblies and/or liquid reservoirs in the at least one main treatment unit.

The at least one secondary dispensing unit can be equipped with one or more liquid processing assemblies, which may be thereby used to apply one or more processes to the treated liquid product before dispensing the same via a dispenser thereof. For this purpose, the at least one secondary dispensing unit can be equipped with a liquid reservoir configured to receive and hold streams of treated liquid product from the at least one main treatment unit. One or more liquid level sensors can be used to measure the level of the treated liquid product contained inside the liquid reservoir of the at least one secondary dispensing unit, and generate liquid level signals/data indicative thereof.

The at least one secondary unit can be configured as a gravity based liquid dispense e.g., have a mechanical dispensing valve configured to stream liquid stored in its reservoir by gravitational forces. In this case the dispensing of the liquid from one or more secondary units can be carried out at any given time and simultaneous to liquid dispensing from the at least one main unit, assuming it is equipped with a dispenser. In possible embodiments one or more of the secondary units can be configured for pressurized dispensing (e.g., as in the main unit), and in this case the system can be configured to prohibit simultaneous liquid dispensing by two or more units, and/or simultaneous liquid supply and dispensing, to thereby prevent loss in flowrate. For example, in some embodiments the filling of the secondary units is a pressurized based process, and in this case the system is configured to prohibit filling of the at least one secondary unit and simultaneously dispensing liquid product by the main unit (assuming it is equipped with a dispenser).

For example, and without being limiting, if the dispensed liquid is water, the one or more liquid processing assemblies of the secondary dispensing units can be configured to produce therefrom ice cubes, one or more beverages (e.g., coffee, tea, and/or carbonated water and/or juices), purified water, oxygenated (oxygen enriched) water, mineralized water, energized water, and/or suchlike.

At least one main control unit can be used in the at least one main treatment unit to receive from the at least one secondary dispensing unit requests for the treated liquid product for filling its liquid reservoir. At least one secondary control unit can be used in the at least one secondary dispensing unit to process the liquid level signals/data from the at least one level sensor, and generate requests for the treated liquid product from the main treatment unit. The request for treated liquid product may comprise an indication of the amount of treated liquid product required for filling the liquid reservoir of the at least one secondary dispensing unit.

The requests for the treated liquid product can be communicated over electric wires and/or wirelessly. In some embodiments, one or more cable assemblies, each comprising liquid conduit(s) and electric wires, is used to connect between the main and secondary units. The liquid conduit(s) of the cable assembly is configured to stream the treated water product between the units, and the electric wires are used to communicate control signals and/or data between the units. Optionally, but in some embodiments preferably, at least some of the electric wires of the cable assembly are power supply wires. The power supply wires can be used to power one or more devices/components of the secondary dispensing unit, as described hereinbelow in details.

For an overview of several example features, process stages, and principles of the invention, the liquid dispensing arrangement examples illustrated schematically and diagrammatically in the figures are intended for dispensing water products. These water dispensing arrangements are shown as one example implementation that demonstrates a number of features, processes, and principles used to distribute the dispensing of various different water products, but they are also useful for other applications/liquids and can be made in different variations. Therefore, this description will proceed with reference to the shown examples, but with the understanding that the invention recited in the claims below can also be implemented in myriad other ways, once the principles are understood from the descriptions, explanations, and drawings herein. All such variations, as well as any other modifications apparent to one of ordinary skill in the art and useful in liquid dispensing applications may be suitably employed, and are intended to fall within the scope of this disclosure.

FIG. 1 schematically illustrates a water dispensing arrangement 10 according to some possible embodiments. The water dispensing arrangement 10 comprises a main treatment unit 11, and one or more secondary dispensing units A1, A2, . . . , An, in fluid communication therewith. The main treatment unit 11 is configured to receive a stream of source water (e.g., tap-water) 11$r$, via a supply conduit 13 connected to an inlet port 11$i$ thereof, and apply one or more treatments to the supplied source water stream 11$r$. For example, but without being limiting, the main treatment unit 11 comprises in some embodiments a filter device 11$t$ configured to filter the stream of source water 11$r$ received via the inlet port 11$i$. The treated water from the filter device 11$t$ is streamed to a dispenser device 11$d$ of the main treatment unit 11 and/or to the one or more secondary dispensing units A1, A2, . . . , An, via one or more conduits 12 connected to respective outlet ports O1, O2, . . . , On, of the main unit 11.

Each outlet port O1, O2, . . . , On, of the main unit comprises in some embodiments a normally closed one way valve (Vx in FIG. 5) configured to permit flow therethrough only when a suitable conduit is connected thereto e.g., the valve of the outlet port can be configured to change into an open state responsive to the connection of the conduit 12 thereto. In possible embodiments the valve (Vx) provided in one or more of the outlet ports O1, O2, . . . , On, of the main unit 11 is a normally closed electrically controlled valve, which may be controllably changed into an open state regardless of whether a secondary dispensing unit A1, A2, . . . , An, is connected to the main unit 11.

Each secondary dispensing unit Ai (where $1 \leq i \leq n$ is an integer) have at least one inlet port Pn connectable to a conduit 12 for receiving streams of treated water from the main unit 11. Optionally, one or more of the secondary dispensing units further have at least one outlet port Po for transferring streams of the treated water thereby received to respective at least one other secondary dispensing unit. This way several secondary dispensing units can be concatenated one to the other to permit continuous successive supply of the treated water from the main unit 11 to a number of secondary dispensing units. FIG. 1 exemplifies such concatenation of several secondary dispensing units in the serial connection of the secondary dispensing unit A1 to a number of other secondary dispensing units a, b, c, . . . , n, by conduits 12 that connect the outlet port Po of one of the secondary dispensing units to the inlet port Pn of another one of the secondary dispensing units.

Each of the inlet ports Pn, and/or the outlet ports Po, of the secondary units comprise in some embodiments a normally closed one way valve (Vx in FIG. 5) configured to permit flow therethrough only when a suitable conduit 12 is connected thereto e.g., the valve of the inlet/outlet ports Pn/Po can be configured to change into an open state responsive to the connection of the conduit thereto. In possible embodiments the valve (Vx) provided in one or more of the inlet/outlet ports Pn/Po is a normally closed electrically controlled valve, which state is controlled by its respective secondary unit. Optionally, but in some embodiments preferably, the tube 12 used to connect each secondary unit is integrally assembled thereinto as part of the unit, so it cannot be disconnected therefrom. In such embodiments the valve (Vx) provided in the inlet/outlet ports Pn/Po is a normally closed electrically controlled valve assembled directly into the tube 12 inside the secondary unit.

The main treatment unit 11 further comprises a controllable valve (e.g., a solenoid valve) V1 coupled to a conduit connecting between the inlet port 11i and the filter device 11t. The controllable valve V1 is configured to receive control signals C1, whenever the treated water product is required by its dispenser device 11d and/or by the secondary dispensing units Ai, and responsively stream the source water 11r to the filter device 11t. An additional controllable valve V2 can be used in a conduit connecting between the filter device 11t and the dispenser device 11d for controlling the dispensing of the treated water product produced by the filter device 11t via the dispenser device 11d responsive to control signals C2.

Optionally, but in some embodiments preferably, the main treatment unit 11 comprises one or more flow sensing devices (e.g., flowmeter) 11m for measuring the amount of treated water product supplied to its dispenser device and/or to the secondary dispensing units Ai, and generating flow signals/data S1 indicative thereof. In this specific and non-limited example a single flow sensing device 11m is coupled to an outlet of the filter device 11t, however, it may be similarly coupled to an inlet of the filter device 11t for serving the same purpose.

One or more control units 11e can be used in the main treatment unit 11 for generating the control signals C1 whenever there is a need for the treated water product, and/or the control signals C2 to control the dispensing of the treated water product by the dispenser device 11d. The one or more control units 11e can have one or more processors and memories (not shown), configured and operable to execute program instructions for determining when the control signal C1 and/or C2 should be generated. The one or more control units 11e can be further configured to receive and process the flow signals/data S1 generated by the one or more flow sensing devices 11m, and determine based thereon if conditions for generating the control signal C1 and/or C2 are fulfilled. For example, the one or more control units 11e can be configured to process the flow signals/data S1 generated by the one or more flow sensing devices 11m and adjust the control signal C1 and/or C2 accordingly if it is determined that a determined amount of the treated liquid water been supplied.

FIG. 1 exemplifies parallel connection of the secondary dispensing unit A1, A2, . . . , An, to the main unit 11, and serial connection of the secondary dispensing units a, b, c, . . . , n, to the secondary dispensing unit A1. It is noted that the secondary dispensing units a, b, c, . . . , n, can be similarly connected to any other one of the secondary dispensing unit A2, . . . , An, or directly to the main unit 11. It is also noted that the secondary dispensing units can be connected to the main unit only by the parallel connection, or only by the serial connection, or any other combination thereof.

Figure 2:
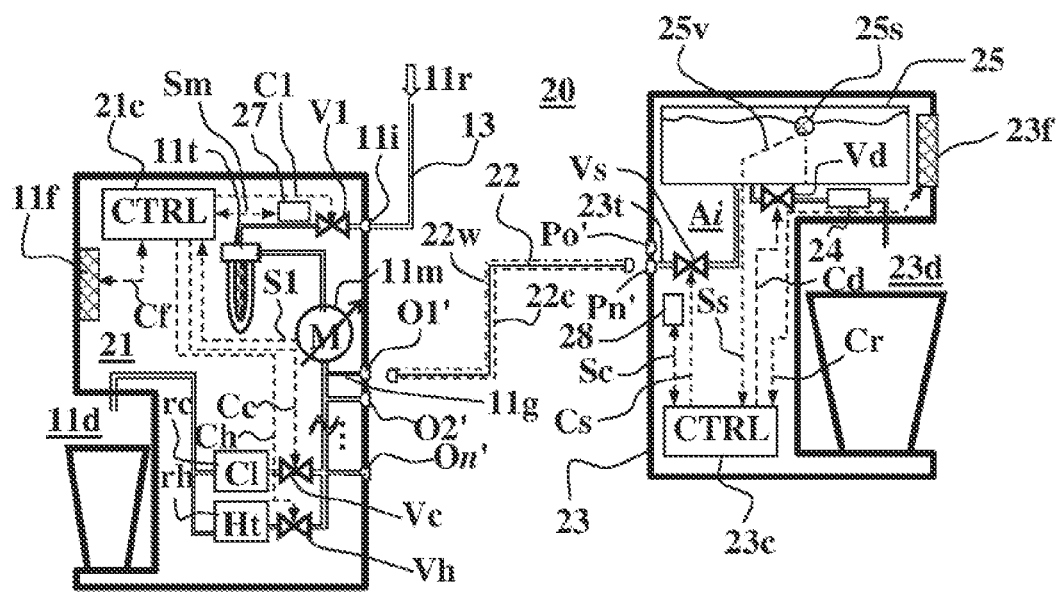
FIG. 2 schematically illustrates details of main and secondary units according to some possible embodiments.

FIG. 2 schematically illustrates a water dispensing arrangement 20 comprising a main treatment unit 21 and a secondary dispensing unit 23. It is noted that the water dispensing arrangement 20 may include a plurality secondary dispensing units 23 connected directly to the main treatment unit 21, and/or in concatenation to the secondary dispensing unit Ai, as exemplified in FIG. 1.

The main treatment unit 21 comprises some of the components used in the main treatment unit 11 shown in FIG. 1, which are designated by the same reference numerals, and which functionality and operation is substantially similar in FIG. 2. The main treatment unit 21 further comprises one or more water processing assemblies Cl,Ht configured to apply respective one or more processes to the treated water product received from the filter device 11t, and respective controllable valves Vc,Vh for controlling the flow of the treated water product from the filter device 11t thereto. The main treatment unit 21 further comprises a user interface device 11f configured to receive user's inputs (e.g., using push buttons and/or a touchscreen/touchpad—not shown), and/or present information to the user (e.g., using liquid crystal display—LCD, or touchscreen—not shown). The user interface device 11f is configured to exchange signals/data Cf with the at least one control unit 21c, indicative of the user's inputs and/or of the information to be thereby presented to the user.

The at least one control unit 21c is configured to receive the user's inputs (Cf) from the user interface device 11f, and based thereon generate the control signals Ce,Ch for applying the one or more processes by the assemblies Cl,Ht to the treated water product produced by the filter device 11t. For example, but without being limiting, the control unit 21c can be configured and operable to generate control signals Ce based on the user's inputs (Ff) for controlling the state of the controllable valve Vc to use the cooling process assembly Cl to cool the treated water product streamed to the dispenser 11d, and/or the control signals Ch for controlling the state of the controllable valve Vh to use the heating process assembly Ht to heat the treated water product streamed to the dispenser 11d. Optionally, the control unit 21c can be configured and operable to simultaneously generate control signals Ce and Ch based on the user's inputs (Cf) for controlling the states of the controllable valves Vc and Vh to use both the cooling and heating process assemblies, Cl and Ht, for dispensing a mixture of the heated and cooled treated water product streamed to the dispenser 11d at a desired temperature (or within a desired temperature range) required by the user.

The main treatment unit 21 comprises in some embodiments one or more reservoirs rc,rh. For example, and without being limiting, the main treatment unit 21 can have a respective reservoirs rc,rh for each water processing assembly Cl,Ht configured to store a determined amount of the processed water product thereby produced. In FIG. 2 the reservoir rc is used to store cold water product produced by the cooling process assembly Cl, and the reservoir rh is used to store hot water product produced by the heating process assembly Ht. The at least one control unit 21c can be accordingly configured to generate control signals Ce for streaming the treated water product to the cooling process assembly Cl to fill the cold water reservoir rc whenever needed, and/or the control signals Ch for streaming the treated water product to the heating process assembly Ht to fill the hot water reservoir rh whenever needed.

In some embodiments the secondary dispensing device 23 comprises a reservoir 25 for storing the streams of the treated water product thereby received via its inlet port Pn'. One or more level sensing devices 25s may be used to measure the level of the water contained inside the reservoir 25, and generate measured level signals/data 25v indicative thereof. The secondary dispensing unit 23 can be configured to draw streams of the treated water product from the main treatment unit 21 whenever the level of the treated water product maintained inside reservoir 25 reaches\falls below a defined minimum-level threshold value. The secondary dispensing device 23 can be further configured to terminate the streams of the treated water product from the secondary dispensing unit 23 whenever the level of the treated water product maintained inside its reservoir 25 reaches\exceeds a determined maximal-level threshold value.

In possible embodiments the secondary dispensing unit 23 is configured to periodically request the treated water product (e.g., a predefined minimum amount) from the main treatment unit 21 (e.g., every 30 min), regardless of the amount of the treated water product contained inside the reservoir 25. The secondary dispensing unit 23 can be configured to stop the stream of the treated water product supplied thereto from the main unit 21 whenever the measured level signals/data 25v from the one or more level sensing devices 25s are indicative of overfill (e.g., top level sensor reached).

A controllable valve (e.g., solenoid valve) Vs coupled to a conduit connecting between the inlet port Pn' and the reservoir 25 can be used to control the flow of the treated water product received via the inlet port Pn' of the secondary unit 23. One or more secondary control units 23c can be used in the secondary dispensing unit 23 to process the measured level signals/data 25v generated by the one or more level sensing devices 25s and generate based thereon control signals Cs for controlling the state of the controllable valve Vs e.g., according to the defined minimum-level and maximum-level threshold values. The one or more secondary control units 23c can have one or more data processing units and memories (not shown) configured and operable to execute program instructions for generating the control signals used to operate the secondary dispensing unit Ai.

A controllable valve Vd can be used to control flow of the treated water product from the reservoir 25 to the dispenser device 23d of the secondary dispensing unit Ai. The secondary dispensing unit can use one or more water processing assemblies 24 coupled to the conduit connecting between the reservoir 25 and the dispenser device 23d, for applying one or more processes to the treated water product streamed from the reservoir 25 to the dispenser 23d. For example, but without being limiting, the one or more water processing assemblies 24 may be configured to apply at least one of the following processes to the treated water product from the reservoir 25: heating, cooling, freezing (e.g., for producing ice cubes), carbonation, beverage preparation, energizing, mineralizing, purifying, and suchlike.

The secondary dispensing unit Ai can also include a user interface device 23f configured to receive user's inputs (e.g., using push buttons and/or a touchscreen/touchpad—not shown), and/or present information to the user (e.g., using liquid crystal display—LCD, or touchscreen—not shown). The user interface device 23f is configured to exchange signals/data Cr with the at least one secondary control unit 23c, indicative of the user's inputs and/or of the information to be thereby presented to the user. The at least one secondary control unit 23c can be thus configured and operable to process signals/data Cr from the user interface device 23f and generate based thereon control signals Cd for controlling the state of the controllable valve Vd whenever there is a need to dispense treated water product processed by the one or more water processing assemblies 24 via the dispensing device 23d.

Optionally, but in some embodiments preferably, the secondary dispensing unit 23 is configured to generate requests for determined amounts of the treated water product from the main treatment unit 21 based on the measured level signals/data 25v generated by the one or more level sensing devices 25s. For this purpose, in some embodiments, a cable assembly 22 having one or more conduits 22c and electrical wires 22w is used to provide fluid communication and electrical connectivity between the main and secondary units, 21 and 23 respectively. The one or more conduits 22c of the cable assembly 22 are used to stream the treated water product, and at least some of its electric wires 22w are used for communicating control signal and/or data between the units 21 and 23. The one or more control units 21c of the main treatment unit 21 can generate control signals and/or data Sm transmitted over the cable assembly 22 to the secondary units Ai, and the one or more secondary control units 23c of the secondary unit Ai can generate control signals and/or data Sc transmitted over the cable assembly 22 to the main unit 21.

The main and/or the secondary units comprise in some embodiments a communication module, 27 and 28 respectively, configured and operable to communicate the control signals and/or data, Sm and Sc respectively, therebetween over the electric wires 22w of the cable assembly 22 and/or wirelessly e.g., using WiFi, ZigBee, Bluetooth, Bluetooth low energy—BLE, near field communication—NFC, or suchlike. As will be explained below in details, the communication modules 27 and/or 28 of the main and/or secondary units respectively, can be further configured to communication signals/data with external devices/equipment and/or computer systems, such as, but not limited to, smart devices (e.g., smartphones or tablets), remote computer machines/servers and/or databases, remote and/or local data networks, etc.

This way, the one or more secondary control units 23c can be configured to process the measured level signals/data 25v generated by the one or more level sensing devices 25s, and based thereon generate request control signals/data Sc for a defined amount of treated water product from the main treatment unit 21. The one or more control units of the main treatment unit 21c can be configured to receive and process the control signals/data Sc from the secondary unit 21, generate control signals C1 for streaming source water 11r through the controllable valve V1 to the filter device 11t, and control signals/data Sm for instructing the one or more secondary control units 23c to generate control signals Cs for changing the state of the controllable valve Vs for receiving the stream of treated water product streamed through the cable assembly 22 into the reservoir 25.

Figure 3:
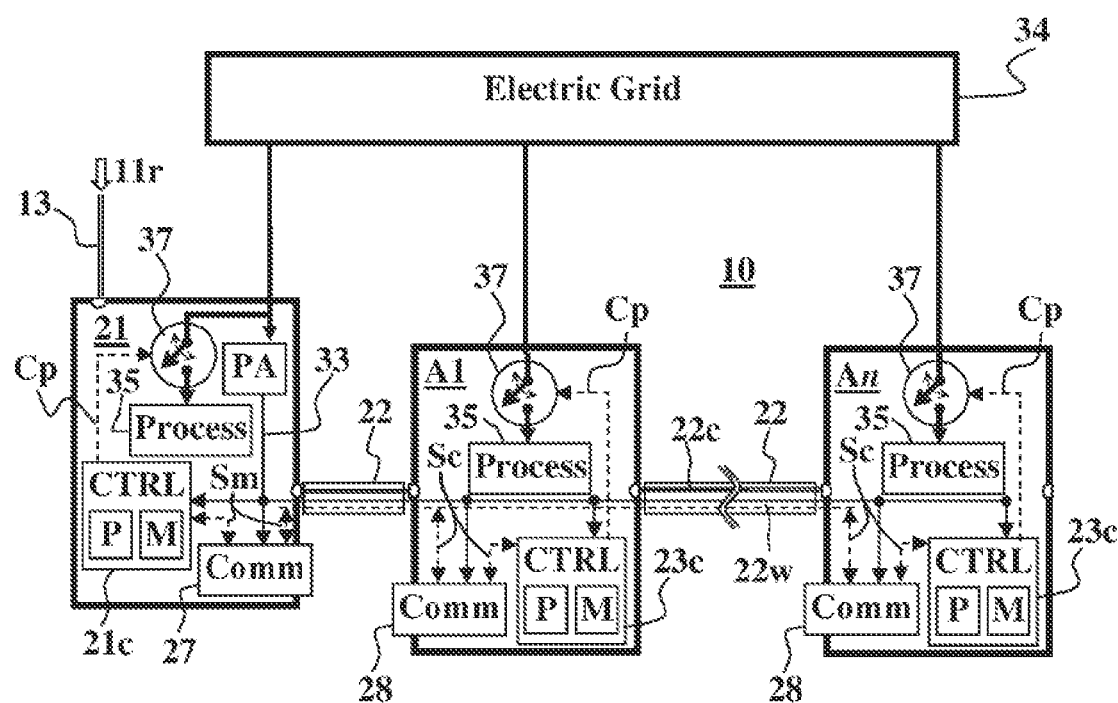
FIG. 3 schematically illustrates a power management scheme for a liquid dispensing arrangement according to some possible embodiments.

FIG. 3 schematically illustrates a power management scheme for a liquid dispensing arrangement 10 according to some possible embodiments. In this specific and non-limiting example the main unit 21, and all secondary units A1, . . . , An, are connected to the electric grid 34. The main unit 21 comprises a power adapter PA unit configured to receive the power supply of the electric grid 34, and generate therefrom one or more low-voltage power supplies 23 for driving low-voltage components of the system. In this specific and non-limiting example the low-voltage power adapter PA is configured to drive the control unit 21c, and the communication module 27 of the main unit 21. Optionally, but in some embodiments preferably, the low-voltage power supply 33 generated by the power adapter PA is delivered over the wires 22w of the cable assembly 22 for driving low-voltage components thereof. For example, the low-voltage power supply 33 from the main unit 21 can be used for powering the secondary control units 23c of the secondary units A1, . . . , An, as shown in FIG. 3. FIG. 3, also demonstrates using the low-voltage power supply 33 from the main unit 21 for powering communication modules 28 of the secondary units A1, . . . , An.

The main unit 21, and the secondary units A1, . . . , An, comprise water processing assemblies 35 configured to apply one or more processes to the treated water from the main unit 21. For example, the water processing assemblies 35 may comprise heating (e.g., Ht in FIG. 2), vaporization, cooling (e.g., Cl in FIG. 2), freezing, and/or any other process the units may require (e.g., 24 in FIG. 2) for preparing and dispensing a certain product to the end user. Optionally, but in some embodiments preferably, each of the control units, 27 and 28, of the main and secondary units, 21 and A1, . . . , An, are configured and operable to generate control signals Cp for selectively powering only one or more of the processing assemblies 35 at the same time, and thereby prevent overloading the electric grid 34. Accordingly, each water processing assembly 35 can be operated by a respective switch device 37 configured to electrically connect the water processing assembly 35 to the electric grid 34 whenever the control signal Cp is issued.

In possible embodiments only the main unit 21 is connected to the electric grid 34, and the secondary units A1, . . . , An, are configured to receive their power supply from the main unit 21. In such possible embodiment the main unit 21 can comprise a plurality of switching devices 37, each associated with a specific secondary unit Ai, and the control unit 21c of the main unit 21 can be configured to generate control signals Cp to selectively activate and deactivate the power supply thereby provided to the secondary units based on a predefined power consumption policy of the system 10 e.g., for improved efficiency and/or preventing overloads on the electric grid 34.

FIG. 3 further shows the control units, 21c and 23c, of the main and secondary units comprising one or more processors P and memories M. The memories M can be used to store program code and other data used for the execution by the one or more processors P of each unit for carrying out operational and maintenance procedures of the units. This way the main and/or secondary units can be programmed to records users' preferences and usage patterns and monitor and adjust the operation and maintenance of the units accordingly. It is noted that although FIG. 3 exemplifies a serial connection of the main (21) and secondary (A1, . . . , An) units, the power management, and/or any other resource management, scheme described herein can be similarly implemented in a parallel connection of the units, such as shown in FIG. 1.

Figure 4:
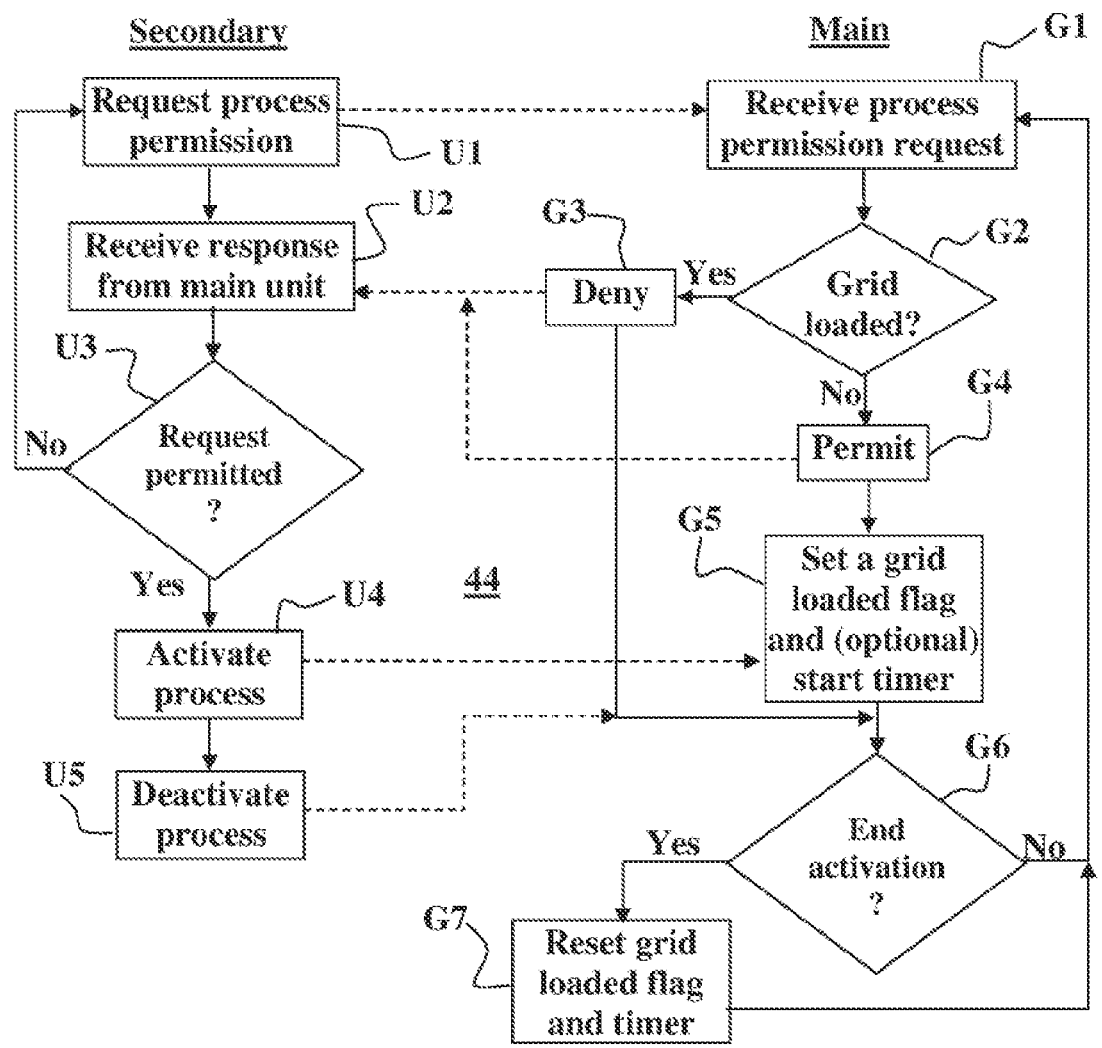
FIG. 4 is a flowchart demonstrating power management in a liquid dispensing arrangement according to some possible embodiments.

FIG. 4 is a flowchart showing a power management process 44 for a water dispensing arrangement according to some possible embodiments. The process 44 starts in step U1 wherein a secondary unit (Ui) issue a request to activate one or more of its water processing assemblies (35 e.g., water heating). The request is transmitted to the main unit (21) over the cable assembly (22), or wirelessly, and thereby received in step G1. The secondary then waits to receive a response from the main unit. In step G2 the main unit checks if the electric grid (34) is loaded based on previous activation of one or more water processing assemblies (35) of the main and/or the secondary units. In some embodiments the control unit (21c) of the main unit (21) is configured and operable to permit only activation of only one water processing assembly (35), to thereby prevent situations wherein two or more water processing assemblies are simultaneously operating in the water dispensing arrangement (10). For example, in some embodiments the control unit (21c) of the main unit (21) is configured and operable to permit water heating to be carried out by only one of the units (21, A1, . . . , An) of the dispensing arrangement (10 or 20) at any given time.

If it is determined in step G2 that the electric grid (34) is not loaded, in step G4 the main control unit (21c) issues permission to activate the water processing assembly (35) of the secondary unit (Ai). Otherwise, if it is determined in step G2 that the electric grid (34) is loaded, in step G3 the main control unit (21c) the process activation request of the secondary unit (Ai) is denied. In step U2 the secondary unit (Ai) receives the response issued by the control unit of the main unit, and in step U3 the response is checked. If it is determined in step U3 that permission to activate the water processing assembly (35) been granted by the main menu, in step U4 the secondary control unit (28) activates the water processing assembly (35) e.g., by issuing the activation signal CP. If it is determined in step U3 that the request to activate the water processing assembly (35) been denied by the main menu, the control is passed back to step U1 to restart the power management process 44.

In step U4, the control unit (28) of the secondary unit (Ai) further notifies the main unit (21) that its water processing assembly (35) been activated. In step G5, the main unit (21) receive the activation notification from the secondary unit (Ai) and responsively sets a grid loaded flag. Optionally, a timer for counting the time duration of the process activation is also started in step G5. Optionally, but in some embodiments preferably, the grid load determination of step G2 is mainly, or entirely, based on the state of the grid loaded flag. After performing the required water processing in the secondary unit, in step U5 the secondary control unit (28) deactivates the water processing assembly (35) e.g., by resetting the signal Cp.

In step G6, the main control unit (27) checks if the water processing of the secondary unit needs to end according to timer count, or already been deactivated in step U5. If neither of these conditions is fulfilled the control is pass to step G1, to process further water processing requests, deny in step G3 any new request for activation of a water processing assembly of the main or the secondary units, and for rechecking in step G6 if the conditions to end the current activation are fulfilled. If it is determined in step G6 that a determined allowed process activation time has lapsed based on the timer count state, a process deactivation indication is issued to deactivate the process in step U5. Step G7 is carried out if the secondary unit issues a deactivation notification in step U5, or when the timer count indicates that the determined allowed process activation time had passed, to reset the grid loaded flag and the process activation timer. Optionally, before resetting the timer in step G7, the time count of the timer is recorded in the memory (M) of the main control unit (21c) for monitoring usage of each water processing assembly 35 and maintenance thereof. Thereafter, the control is passed to step G1 to process further water processing requests.

Figure 5:
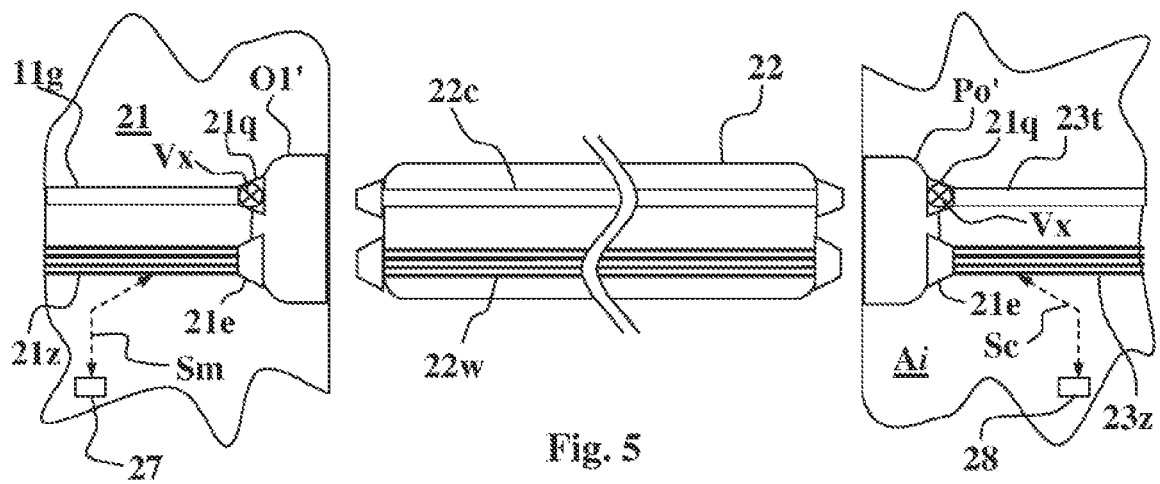
FIG. 5 schematically illustrates connectivity between main and secondary unit according to some possible embodiments.

FIG. 5 schematically illustrates the connectivity between the main and secondary units, 21 and Ai, obtained in some embodiments by the cable assembly 22. A modified outlet assembly O1' is used in the main unit 21 to connect the conduit 22c of the cable assembly 22 to a conduit connector 21q used to establish fluid communication between the conduit 22c of the cable assembly 22 and the internal conduit system 11g of the main unit 21, and to connect the electrical wires 22w of the cable assembly 22 to an electrical connector 21e used to electrically couple between the electrical wires 22w of the cable assembly 22 and the electrical wires 21z of the main unit 21. Similarly, a modified inlet assembly Po' is used in the secondary unit Ai to connect the conduit 22c of the cable assembly 22 to a conduit connector 21q used to establish fluid communication between the conduit 22c of the cable assembly 22 and the internal conduit system 23t of the main unit 21, and to connect the electrical wires 22w of the cable assembly 22 to an electrical connector 21e used to electrically couple between the electrical wires 22w of the cable assembly 22 and the electrical wires 23z of the main unit Ai.

The conduit connector 21q of the modified outlet assembly O1', and/or of the modified inlet assembly Po', comprises in some embodiments a normally closed one way valve Vx configured to change into an open state when a suitable conduit/connector is connected thereto, and otherwise prevent fluid passage therethrough. In some embodiments the valve Vx installed in the modified outlet assembly O1' pf the main unit 21, and/or in the modified inlet assembly Po' of the secondary unit Ai, is a normally closed electrically controlled valve configured to change into an open state responsive to control signals (not shown) generated by the one or more control units whenever the treated water product is to be streamed therethrough.

The electrical wires 21z of the main unit 21 are configured to transfer the control signals and/or data Sm generated by the one or more control units 21c of the main unit 21 over the electrical wires 22w of the cable assembly 22 to the one or more control units 23c of the secondary unit Ai. Optionally, but in some embodiments preferably, the communication of the control signals and/or data Sm is carried out by the communication module 27 of the main unit 21, over the cable assembly 22 and/or wirelessly.

The electrical wires 23z of the secondary unit Ai are configured to transfer the control signals and/or data Sc generated by the one or more control units 23c of the secondary unit Ai over the electrical wires 22w of the cable assembly 22 to the one or more control units 21c of the main unit 21. Optionally, but in some embodiments preferably, the communication of the control signals and/or data Sc is carried out by the communication module 28 of the secondary unit Ai, over the cable assembly 22 and/or wirelessly.

In some embodiments the same wires 22w of the cable assembly 22 are used for communicating the control signals and/or data Sm generated by the one or more control units 21c, and the control signals and/or data Sc generated by the one or more secondary control units 23c, utilizing an asynchronous communication scheme. In some embodiments at least some of the wires 22w of the cable assembly 22 are power supply wires used for powering one or more components of the secondary unit Ai, such as, but not limited to, the one or more secondary control units 23c.

In a possible embodiment two of the wires 22w of the cable assembly 22 are used for conducting asynchronous communication between the main unit 21 and the secondary units Ai. The communication in this case can define the main unit as a slave, and at least one of the secondary units Ai as a master. This means that the communication over the communication wires will be always commenced by one of the secondary units Ai, and that the communication conducted by the main unit 21 over the communication wires is always responsive to signals/data transmitted by one or more of the secondary units. Optionally, the system is configured to define one master secondary unit device, which may be periodically, intermittently, or casually replaced by another one of the secondary units.

The communication between the units may carried out by message frames having variable lengths, and optionally, a maximal permitted length (e.g., 32, 64, 128, 256 bytes, or more). In some embodiments the asynchronous communication is based on a type of universal asynchronous receiver transmitter (UART) protocol is used with 115200 bps baudrate and 32-bit CRC for frame integrity. The communication protocol can be configured to provide the main unit 21 control over the shared resources of the system 10, such as, but not limited to, the treated water product and/or the power supply of the electric grid. This way, the main unit 21 can be configured to approve or disapprove requests received from the secondary units for the treated water product, and/or for activation of power consuming processes (e.g., heating, cooling, etc.).

In some embodiments the cable assembly 22 is an integral part of the secondary unit Ai, and in such embodiments the connection means, the conduit connector 21q and/or the electrical connector 21e are not necessarily required in the inlet assembly Po' of the secondary unit Ai.

Figure 6:
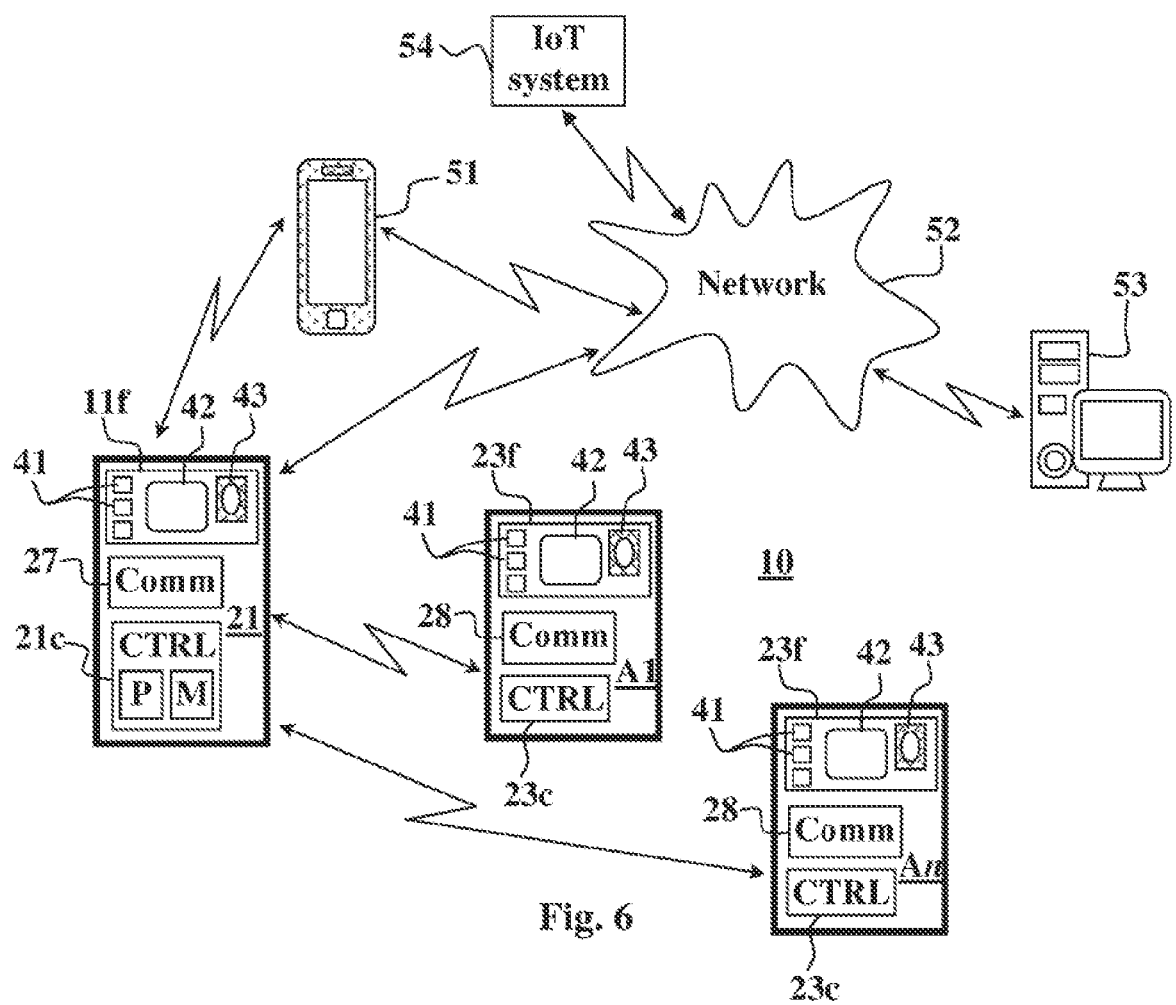
FIG. 6 schematically illustrates communications in a liquid dispensing arrangement according to some possible embodiments.

FIG. 6 schematically illustrates communication schemes in a liquid dispensing arrangement 10 according to some possible embodiments. In this specific and non-limiting example the main unit 21 is configured to wirelessly (e.g., using ZigBee, WiFi, Bluetooth, or suchlike) exchange signals/data with a smart device 51 (e.g., a smartphone or tablet) and/or with a remote computer/server/database (e.g., control center) 53 over one or more data networks 52 (e.g., the internet). In some embodiments each of the main and secondary units is configured to communicate (e.g., ZigBee, WiFi, Bluetooth, or suchlike) signals/data directly with the smart device 51 and/or the remote computer 53. The main and/or the secondary units can be configured to utilize the communication with the smart device 51 and/or the remote computer/server to check for software updates from time to time, and download install such software updates whenever they become available.

In some embodiments the main unit 21 is configured to transmit to the smart device 51 and/or the remote computer 53 data indicative of the amount of row water treated by the filter device (11*t*). The smart device 51 and/or the remote computer 53 can be configured to determine based thereon when the filter device (11*t*) of the main unit should be replaced by a new one, and transmit a corresponding notification to the main unit 21. Additionally, or alternatively, the control unit 21*c* of the main unit 21 is configured and operable to process the data indicative of the amount of row water treated by the filter device (11*t*) and determine based thereon when the filter device needs to be replaced. The data received and processed by the main unit 21, the smart device 51, and/or the remote computer 53, can be used to determine whether replacement of other components of the units is required e.g., carbonation gas containers, UV Lamp.

As shown in FIG. 6, the user interface device 11*f* of the main and/or the secondary unit comprises in some embodiments one or more push/touch buttons 41 for activating and operating the unit, and/or a display device 42 (e.g., LCD, touchscreen) for displaying information to the users. In possible embodiments wherein the display device 42 comprises a touchscreen the push/touch buttons 41 may be redundant and thus may be excluded. Optionally, but in some embodiments preferably, the user interface device 11*f* comprises a user identification device 43 e.g., an imager/camera for face and/or hand geometry and/or vein recognition, fingerprint scanner, and/or any suitable biometric identification device, for user identification and personalization of the units per users' preferences and usage patterns.

Alternatively, or additional, the main and/or the secondary unit can be configured to receive a user identifying code from each user before dispensing the water products by the unit. In certain facilities/organizations personal identification tags carried by the users can be used instead of, or in addition to, the user identification device 43, by embedding a suitable users' tag detection device in the units e.g., RFID, NFC, or such like (not shown). The main and/or secondary control units (21*c* and/or 23*c*) can be accordingly configured to perform user identification procedures before/while dispensing processed water products thereof, and record the time, date, amount, of each processed water product dispensed for each user (generally referred to herein as usage or preference data).

The control units, 27 and 28, of the main and/or the secondary units can be accordingly configured and operable to record usage of the unit, and/or preferences, for each user, based on users' identification data generated by the identification device 43. The smart device 51 and/or the remote computer/server 53 can be used to remotely controlling and operating the main ad/or secondary unit. For example, and without being limiting, specialized software programs/applications can be installed in the smart device 51 and/or the remote computer/server 53, configured and operable to permit remote activation/deactivation of the main/secondary unit, programming the main/secondary unit to prepare a required amount of processed water product for dispensing, instantly, periodically (e.g., on hourly, daily, weekly, and/or monthly basis), and/or at a specific time in the future (e.g., two hours from now, 14:30 tomorrow, etc.)

The main and/or secondary units can be configured to provide various personalization features for each of the users using the system. For example, but without being limiting, each user can define preferred water temperature, amount, and/or any other water processing capability. The dispensing of the processed water product according to the user's preferences can be performed after identifying the user by the user identification device 43, or remotely by a personal smart device 51 of the user. The main and/or secondary units can be further configured to permit each user to define a personal consumption program indicating, for example, a desired daily, and/or weekly, and/or monthly, and/or yearly, water consumption amount, to be monitored by the units according to the recorded dispensing times, dates, and amounts for each user. The main and/or secondary units can be further configured to display the user's progress on the display 42, after the identification procedure, and/or transmit the same for display and/or processing in the smart device 51 and/or the remote computer/server 53.

The smart device 51 and/or the remote computer/server 53 can be configured and operable to generate various alerts to the users of the system 10 indicative of the status of the main and/or secondary units, operation failures and/or errors encountered during their operation and use e.g., malfunction of any of the components used in the units e.g., filter device (11*t*), water processing assemblies (35,24), water leakage in any of the units and/or in the water supply conduit (13).

In some embodiments, smart device 51 and/or the remote computer/server 53 are configured to instruct the main and/or the secondary units to change their mode of operation according to users' presence times/dates. For example, if the users are away for a prescribe time period (e.g., vacation), and/or regularly away during certain time instances (e.g., at nighttime and/or weekends). The smart device 51 and/or the remote computer/server 53 can be configured and operable to instruct the system 10 to switch its main and/or secondary units into a sleep mode (and/or Shabbat mode that permits power compensation that is higher than in sleep mode, and/or any other functional mode) during such time periods, in which only essential operations are performed (e.g., maintenance of treated water stored therein and/or of components of the system/units), and activation of power consuming processes are substantially minimized or altogether eliminated. The smart device 51 and/or the remote computer/server 53 can be configured and operable to instruct the system 10 to switch its main and/or secondary units back into their fully operational states sufficient time before users' presence is expected, or at a preset time and/or date defined by the users.

The users' usage/preference data collected by the main and or secondary units and transmitted to the smart device 51 and/or the remote computer/server system 53 can be further utilized to monitor and adjust each user's consumption of the processed water products dispensed by the system 10. For example, and without being limiting, the smart device 51 and/or the remote computer/server system 53 can be used to analyze the collected users' usage/preference data by dietitians/healthcare personals, and for transmitting to the main and/or secondary units' recommendations, suggestions and/or warnings for future consumption of the processed water products per user accordingly. The control units, 21*c* and 23*c*, of the main and secondary units can be accordingly configured to display such suggestions and/or warnings to each of the users after completing the user identification procedures. Additionally, or alternatively, the control units, 21*c* and 23*c*, can be configured and operable to modify/adjust the processed water products thereby dispensed to specific users based on the recommendations, suggestions and/or warnings received from the dietitians/healthcare personals.

The water dispensing system 10 can be integrated into internet of things (IoT) systems 54 to facilitate automation of its operation and usage, and/or monitor and/or control operation of other devices systems. For example, and without being limiting, water dispensing system 10 can be part of a smart house IoT system, and the notifications generated by the main and/or secondary units, and/or received form the smart device 51 and/or the remote computer/server system 53, can be used as triggers for other processes/operations controlled and monitored by the IoT system 54 e.g., close household water supply if water leakage is identified by the main unit, and/or deactivate or switch into sleep mode household devices/systems when the main and/or secondary units receive notifications indicating user's absence.

Figure 7:
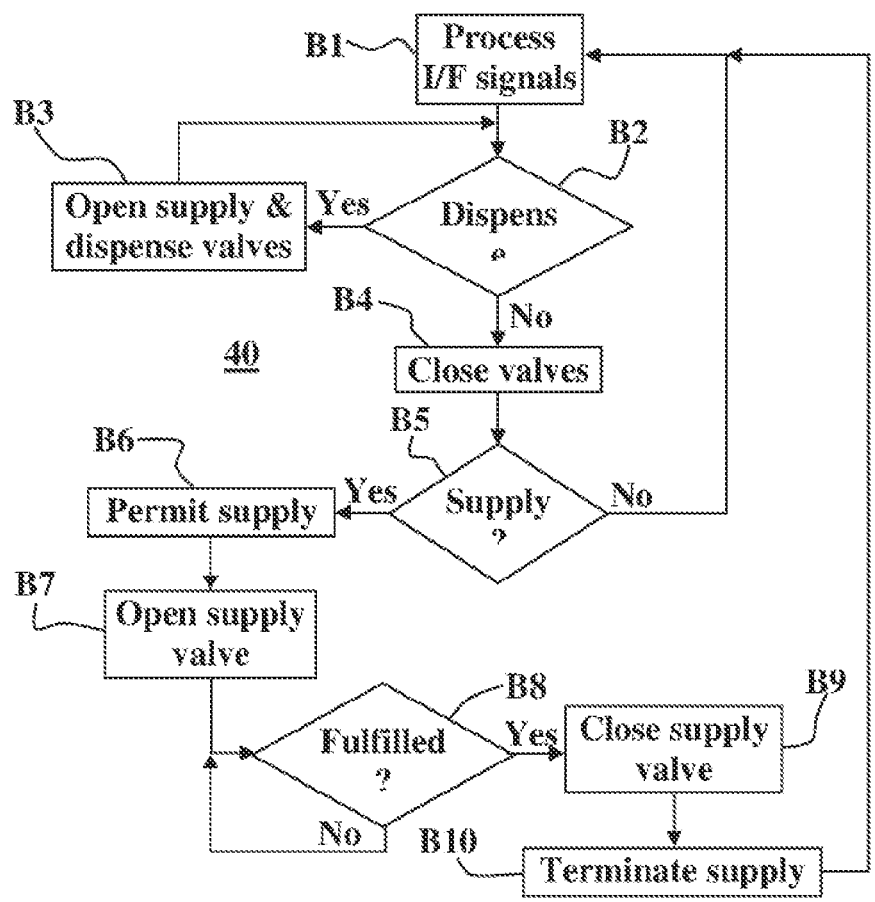
FIG. 7 is a flowchart schematically illustrating a water dispensing process carried out by the main unit according to some possible embodiments.

The flowchart in FIG. 7 illustrates a process 40 for dispensing the treated water product by the one or more control units 21c of the main treatment unit (21) according to some possible embodiments. The process starts in step B1 in which the signals/data (Cf) from the user interface (I/F) device (11f) are processed by the one or more control units (21c) to determine in step B2 whether there is a need to dispense the treated water product by its dispenser (11d). If it is determined in step B2 that there is a need to dispense through the dispenser (11d) the treated water product, in step B3 the one or more control units (21c) generate control signals (C1, Ce or Ch) for streaming source water (11r) to the filter device 11t via the supply valve (V1), and therefrom to the dispenser 11d via the process valve(s) (Vc and/or Vh). Steps B2 and B3 are continuously performed until it is determined in step B2 that the dispensing of the treated water product is to be stopped (e.g., a determined amount of the treated water product been dispensed and/or the signals/data Cf from the user interface device 11f so requires), after which the supply and process valves (V1, Vc and/or Vh) are closed in step B4.

If it is determined in step B2 that there is no need to dispense the treated water product by the dispenser (11d), it is checked in step B5 if request(s) (Sc) for the treated water product are received from the secondary dispensing unit (23). If there are no such requests (Sc) for the treated water product, the control is passed to step B1 to restart the water dispensing process 40. Otherwise, if it is determined that there are request(s) (Sc) for the treated water product from the secondary dispensing unit (23) that can be fulfilled, in step B6 a permit supply notification (Sm) is issued over the cable assembly 22 for instructing the one or more secondary control units (23c) to issue control signal(s) (Cs) for changing the state of supply valve(s) (Vs) of the secondary unit (Ai) for receipt of the treated water product from the main unit (21). Next, in step B7, the one or more control units (21c) issue control signals (C1) for opening the source water supply valve (V1), thereby streaming the source water (11r) to the filter device (11t), and the treated water product from the filter device (11t) to the secondary dispensing unit(s) (21).

In step B8 it is determined if the requested amount of treated water product been supplied e.g., based on the level signals/data (25v) from the level sensing devices (25s) of the secondary unit (Ai), and/or the flow signals/data (S1) from the flow sensing devices (11m) of the main unit (21), and if so, in step B9 the one or more control units (21c) issue control signals (C1) for closing the source water supply valve (V1), to thereby terminate the streaming of the source water (11r), and in step B10 a terminate supply notification (Sm) is issued over the cable assembly 22 for instructing the one or more secondary control units (23c) to issue control signal(s) (Cs) for closing the supply valve (Vs) of the secondary unit (Ai). Otherwise, if it is determined in step B8 that the requested amount of the treated water product was not yet supplied (or that the reservoir of the secondary unit is not filled), step B8 is repeated until the requested amount of the treated water product is supplied by the main unit 21. In some embodiments step B8 is further configured to overcome malfunctions by transferring the control to step B9 upon a determined timeout period defined to prevent overflow in the reservoir of the secondary unit. After the treated water product supply steps are completed in step B10 the control can be returned to step B1 to restart the dispensing process 40.

Figure 8:
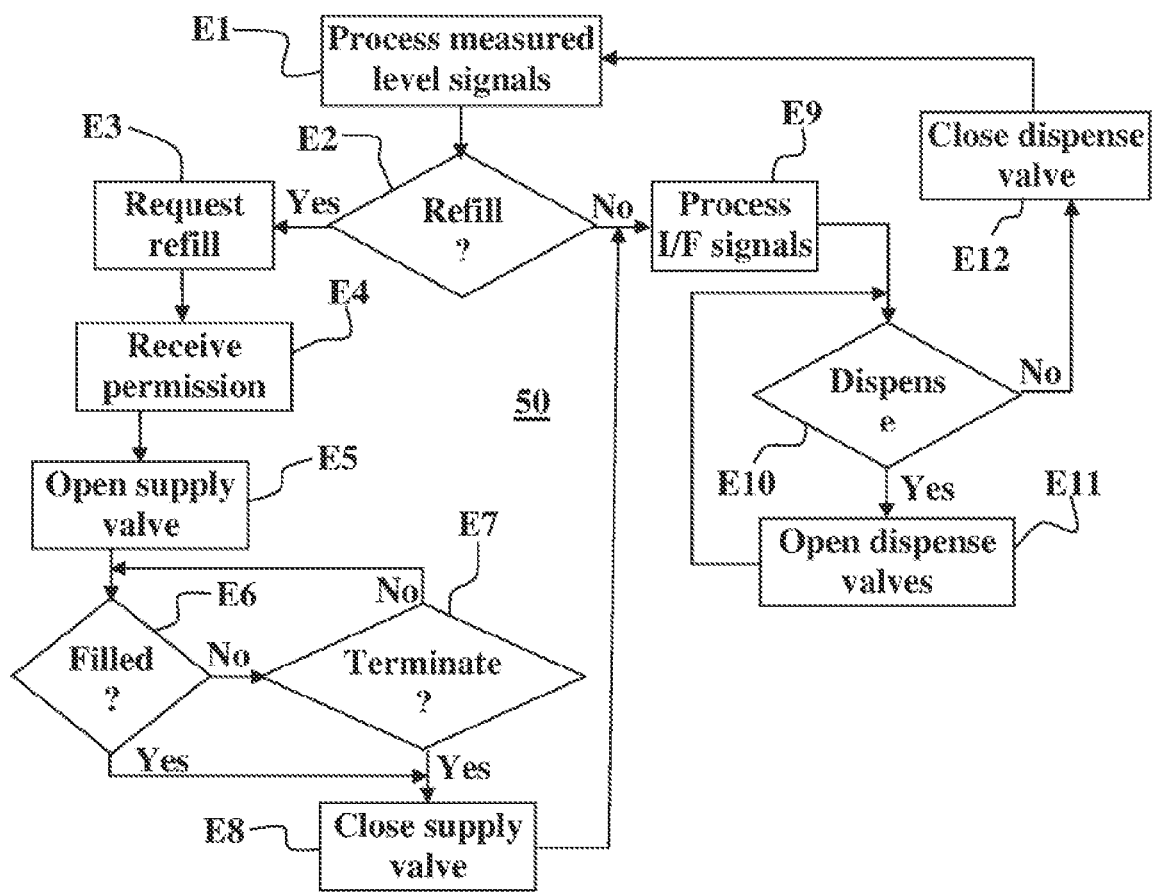
FIG. 8 is a flowchart schematically illustrating a water dispensing process carried out by the secondary dispensing unit according to some possible embodiments.

The flowchart in FIG. 8 illustrates a process 50 for dispensing the treated water product by the one or more secondary control units 23c of the secondary treatment unit(s) (23) according to some possible embodiments. The process starts in step E1 wherein the measured level signals/data (25v) are processed to determine in step E2 if the reservoir (25) needs to be refilled e.g., when the level of the treated water product reaches\falls below a defined minimum-level threshold value. If it is determined in step E2 that the reservoir (25) needs to be refilled, a request for the treated water product is issued (Sc) in step E3. Next, when permission (step B6 in FIG. 7) for the refill is received (Sm) from the main unit (21) in step E4, control signals (Cs) to open the supply valve (Vs) of the secondary unit are generated in step E5, for streaming the treated water product from the main unit (21) to the reservoir (25) of the secondary unit (23).

Step E6 checks if the reservoir (25) is filled based on the measured level signals/data (25v), and if so the control is passed to step E8 in which the supply valve (Vs) is closed. If it is determined in step E6 that the reservoir (25) is not filled e.g., the level of the treated water product did not reach\exceed a defined maximal-level threshold value, step E7 checks if the main unit (21) issued the terminate supply notification (Sm in step B10 of FIG. 7). If it is determined in step E7 that the main unit (21) did not issued the terminate supply notification (Sm), the control is passed back to step E6. The conditions for ending the refill process are repeatedly checked in steps E6 and E7, and once one of these conditions is fulfilled control signal (Cs) to close the supply valve (Vs) are generated in step E8. The control is then passed to step E9, wherein the dispensing of a water product can be commenced.

If it is determined in step E2 that there is no need to refill the reservoir (25), the control is passed to step E9 wherein the signals/data (Cr) from the user interface (I/F) device (23f) of the secondary unit (Ai) are processed to determine in step E10 whether there is a need to dispense the treated water product by the dispenser (23d). If it is determined in step E10 that there is a need to dispense by the dispenser (23d) water product, in step E11 control signals (Cd) are generated for streaming the treated water product from the reservoir (25) via the dispense valve (Vd), and therefrom to the dispenser (23d). Steps E10 and E11 are continuously performed until it is determined in step E10 that the dispensing of the treated water product is to be stopped (e.g., a determined amount of the treated water product been dispensed and/or the signals/data Cr from the user interface device 23f so requires), after which the dispense valve (Vd) are closed in step E12. The control is then passed back to step E1 to restart the dispensing process 50.

It is noted that the process 50 shown in FIG. 8 pertains to embodiments wherein the dispensing is controlled by a controllable/electrical valve. If, however, the dispensing is not carried out using such controllable/electrical valve e.g., if it is mechanical, steps E9 to E12 can be removed from the process 50 i.e., the control will be passed from steps E2 and E8 back to step E1 (instead of steps E9-E12). The system can be configured to indicate via the user interface (I/F) device if the processed water product is ready (e.g., ice cubes, hot/cold water temperature, etc.) For example, but without being limited, in some embodiments the secondary treatment unit (23) can be configured to dispense ice cubes, and such possible embodiments may not require a controllable/electrical valve for the dispensing, but another mechanism. Alternatively, the secondary treatment unit (23) may be configured to just to notify the user via the user interface (I/F) device that the processed water product (e.g., ice cubes) is ready.

Terms such as top, bottom, front, back, right, and left and similar adjectives in relation to orientation of the treatment/dispensing units, and their components, refer to the manner in which the illustrations are positioned on the paper, not as any limitation to the orientations in which the apparatus can be used in actual applications. It should also be understood that throughout this disclosure, where a process or method is shown or described, the steps of the method may be performed in any order or simultaneously, unless it is clear from the context that one step depends on another being performed first.

As described hereinabove and shown in the associated figures, the present invention provides water dispensing arrangements and related methods. While particular embodiments of the invention have been described, it will be understood, however, that the invention is not limited thereto, since modifications may be made by those skilled in the art, particularly in light of the foregoing teachings. As will be appreciated by the skilled person, the invention can be carried out in a great variety of ways, employing more than one technique from those described above, all without exceeding the scope of the claims.

The invention claimed is:

1. A liquid dispensing system comprising:
   at least one main liquid supply unit configured to receive a stream of liquid and apply one or more treatments thereto to obtain a treated liquid product, the main liquid supply unit comprises a dispenser,
   one or more secondary liquid supply units fluidly coupled to said at least one main unit, the main liquid supply unit being configured to selectively stream the treated water product to said dispenser or from the main liquid supply unit to one or more of said secondary liquid supply units,
   a controllable supply valve configured to selectively stream the liquid to the main liquid supply unit whenever the treated liquid product is required by the main liquid supply unit, or by one of the one or more secondary liquid supply units,
   at least one controllable dispensing valve configured to selectively stream the treated liquid product to said dispenser,
   at least one main control unit configured and operable to control the dispensing of the treated liquid product from the main liquid supply unit; and
   a user interface configured to receive user inputs, and wherein the at least one main control unit is configured and operable to change the state of the at least one controllable dispensing valve based on said user inputs.

2. The system of claim 1, comprising one or more additional secondary liquid supply units fluidly coupled to at least one of the secondary liquid supply units.

3. The system of claim 1, comprising at least one liquid processing assembly in the main and/or the secondary liquid supply units for processing the treated liquid product before dispensing it.

4. The system of claim 3, wherein the at least one liquid processing assembly is configured to apply to the treated liquid product at least one of the following: heating, cooling, freezing, vaporizing, sterilizing, purifying, energize, mineralizing.

5. The system of claim 1, comprising at least one flow sensing device configured to measure an amount of the treated liquid product produced by the main liquid supply unit, and generate flow signals/data indicative thereof.

6. The system of claim 1, wherein the at least one main control unit is configured to control the dispensing of the treated liquid product based of the flow signals/data generated by the at least one flow sensing device.

7. The system of claim 1, comprising at least one reservoir in at least one of the liquid supply units for storing thereinside streams of the treated liquid product.

8. The system of claim 7, comprising a controllable secondary supply valve configured to control the stream of the treated liquid product to the at least one reservoir.

9. The system of claim 7, comprising at least one controllable secondary dispensing valve configured to control dispensing of the treated liquid product from the at least one reservoir.

10. The system of claim 8, comprising at least one secondary control unit configured and operable to control the filling of the at least one reservoir with the treated liquid product and/or dispensing it from the at least one reservoir.

11. The system of claim 10, comprising at least one cable assembly configured to fluidly communicate between the main and secondary liquid supply units, and to electrically couple between said main and secondary liquid supply units, wherein the cable assembly comprises at least one conduit for fluidly communicating between the main and secondary liquid supply units, and electrical wires for electrically coupling between said main and secondary liquid supply units, at least some of the electrical wires are power supply wires configured to supply electrical power from the main liquid supply unit to at least one of the secondary liquid supply units.

12. The system of claim 11, wherein the main and secondary control units are configured to implement an asynchronous communication protocol between the main and secondary liquid supply units defining the main liquid supply unit as a slave and at least one of the secondary liquid supply units as master, or defining the main liquid supply unit as the master and at least one of the secondary liquid supply units as the slave.

13. The system of claim 12, wherein the communication protocol is configured to provide the main liquid supply unit control over consumption of shared resources of the system.

14. The system of claim 10, wherein the at least one secondary control unit is configured and operable to transfer to the at least one main liquid supply unit requests for streams of the treated liquid product.

15. The system of claim 14, wherein the at least one main control unit is configured to receive and process the request generated by the secondary control unit and determine based thereon an amount of the treated liquid product to stream thereto.

16. The system of claim 10, wherein the at least one secondary control unit is configured and operable to transfer to the at least one main liquid supply unit requests for activation of power consuming processes thereof.

17. The system of claim 16, wherein the at least one main control unit is configured and operable to selectively approve or deny the requests for activation of power consuming processes to prevent overloads.

18. The system of claim 1, comprising at least one communication module configured to communicate signals/data between the main and/or secondary liquid supply units and an external device or system for thereby monitoring and/or operating the dispensing of the treated liquid product, wherein the main and/or secondary control units are configured and operable to receive instructions from the external device or system to change a state of one of, and/or carrying out maintenance of, and/or carry out firmware updates of, and/or liquid processing in, at least one of the liquid supply units.

19. The system of claim 1, comprising at least one user identification device configured to generate identification data of a user of the main and/or secondary liquid supply units.

20. The system of claim 19, wherein at least one of the control units is configured and operable to have at least one of the functionalities selected from the group consisting of: (a) to use the identification data to conduct a user identification procedure before or during the liquid dispensing, (b) to record usage and/or preference data associated with each identified user, and (c) to receive and monitor personal consumption program of at least one of the identified users.

21. The system of claim 1, comprising a filter device in the main liquid supply unit for carrying out at least one of the treatments to the received liquid.

22. The system of claim 11, wherein the cable assembly comprises at least one conduit for fluidly communicating between the main and secondary liquid supply units, and electrical wires for electrically coupling between said main and secondary liquid supply units.

23. The system of claim 22, wherein at least some of the electrical wires are power supply wires configured to supply electrical power from the main liquid supply unit to at least one of the secondary liquid supply units.

24. The system of claim 18, wherein the main control unit and/or secondary control unit are configured and operable to receive instructions from the external device or system to change a state, carrying out maintenance, and/or carry out firmware updates of at least one of the liquid supply units.

* * * * *